(12) United States Patent
Kluck et al.

(10) Patent No.: US 11,235,271 B2
(45) Date of Patent: Feb. 1, 2022

(54) FILTER CARTRIDGE WITH VENTURI NOZZLE

(71) Applicant: Carl Freudenberg KG, Weinheim (DE)

(72) Inventors: Stefan Kluck, Reilingen (DE); Karsten Schulz, Neckarbischofsheim (DE); Sascha Schumacher, Wald-Michelbach (DE)

(73) Assignee: CARL FREUDENBERG KG, Weinheim (DE)

( * ) Notice: Subject to any disclaimer, the term of this patent is extended or adjusted under 35 U.S.C. 154(b) by 158 days.

(21) Appl. No.: 16/736,853

(22) Filed: Jan. 8, 2020

(65) Prior Publication Data

US 2020/0222844 A1 Jul. 16, 2020

(30) Foreign Application Priority Data

Jan. 10, 2019 (EP) .................................. 19 151 084

(51) Int. Cl.
*B01D 46/00* (2006.01)
*B01D 46/52* (2006.01)
*B01D 46/24* (2006.01)

(52) U.S. Cl.
CPC ..... *B01D 46/0068* (2013.01); *B01D 46/0071* (2013.01); *B01D 46/2414* (2013.01); *B01D 46/521* (2013.01)

(58) Field of Classification Search
CPC ............ B01D 46/4281; B01D 46/2414; B01D 46/521; B01D 46/0068; B01D 46/0071; B01D 46/2411
See application file for complete search history.

(56) References Cited

U.S. PATENT DOCUMENTS

| 4,159,197 A * | 6/1979 | Schuler .............. B01D 46/2411 55/379 |
| 4,746,339 A * | 5/1988 | Millard .............. B01D 46/0001 210/493.2 |
| 5,393,327 A * | 2/1995 | Chambers .......... B01D 46/0067 55/302 |
| 6,638,332 B1 | 10/2003 | Schmitz et al. |
| 8,580,004 B1 | 11/2013 | Clements |
| 9,616,371 B1 * | 4/2017 | Clements ............. B01D 46/002 |
| 2003/0121238 A1 | 7/2003 | Richard |
| 2010/0162672 A1* | 7/2010 | Kim ................... B01D 46/4281 55/365 |
| 2018/0050294 A1 | 2/2018 | Hirsch et al. |

FOREIGN PATENT DOCUMENTS

| DE | 202016005074 U1 | 9/2016 |
| KR | 20140034459 A | 3/2014 |

* cited by examiner

*Primary Examiner* — Robert Clemente
(74) *Attorney, Agent, or Firm* — Leydig, Voit & Mayer, Ltd.

(57) ABSTRACT

A filter cartridge for cleaning an air flow includes a base, a cover provided with a central recess, and at least one pleated filter element arranged between the cover and the base. The at least one filter element encloses an interior space. The cover has a venturi nozzle, and the venturi nozzle engages in the pleated filter element. The venturi nozzle is spread out in comb-like fashion in the region of its end engaging in the filter element.

17 Claims, 4 Drawing Sheets

FILTER CARTRIDGE WITH VENTURI NOZZLE

CROSS-REFERENCE TO RELATED APPLICATION

Priority is claimed to European Patent Application No. 19 151 084.1, filed on Jan. 10, 2019, the entire disclosure of which is hereby incorporated by reference herein.

FIELD

The present invention relates to a filter cartridge.

BACKGROUND

Filter cartridges are used in many fields of technology, for example to clean incoming air or exhaust air and to prevent particles from entering blowers, fans, turbomachines, or the like. The air to be cleaned thereby flows through filter cartridges. Filter cartridges are frequently used as dust filters. In order to enable a long service life of the filter cartridges, it is necessary clean them regularly. This is done by applying an air pulse to the filter cartridge in the reverse direction.

US 2003/0121238 shows filter cartridges with venturi nozzles. A venturi nozzle was attached between each two filter cartridges mounted together. The venturi nozzle is thereby accommodated in the interior space of the lower filter cartridge. The object of the venturi nozzle is to improve the air flow during cleaning by means of air pulses, more precisely to reduce the compressed air consumption for cleaning. In normal operation, if air to be cleaned flows through the filter cartridges, the venturi nozzle can be disruptive. This is because the diameter of the opening through which purified air can escape is reduced by the venturi nozzle. The reduction in diameter is accompanied by an increase in the pressure loss. A greater loss of pressure in turn means a lower energy efficiency of the filter.

SUMMARY

In an embodiment, the present invention provides a filter cartridge for cleaning an air flow. The filter cartridge includes a base, a cover provided with a central recess, and at least one pleated filter element arranged between the cover and the base. The at least one filter element encloses an interior space. The cover has a venturi nozzle, and the venturi nozzle engages in the pleated filter element.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
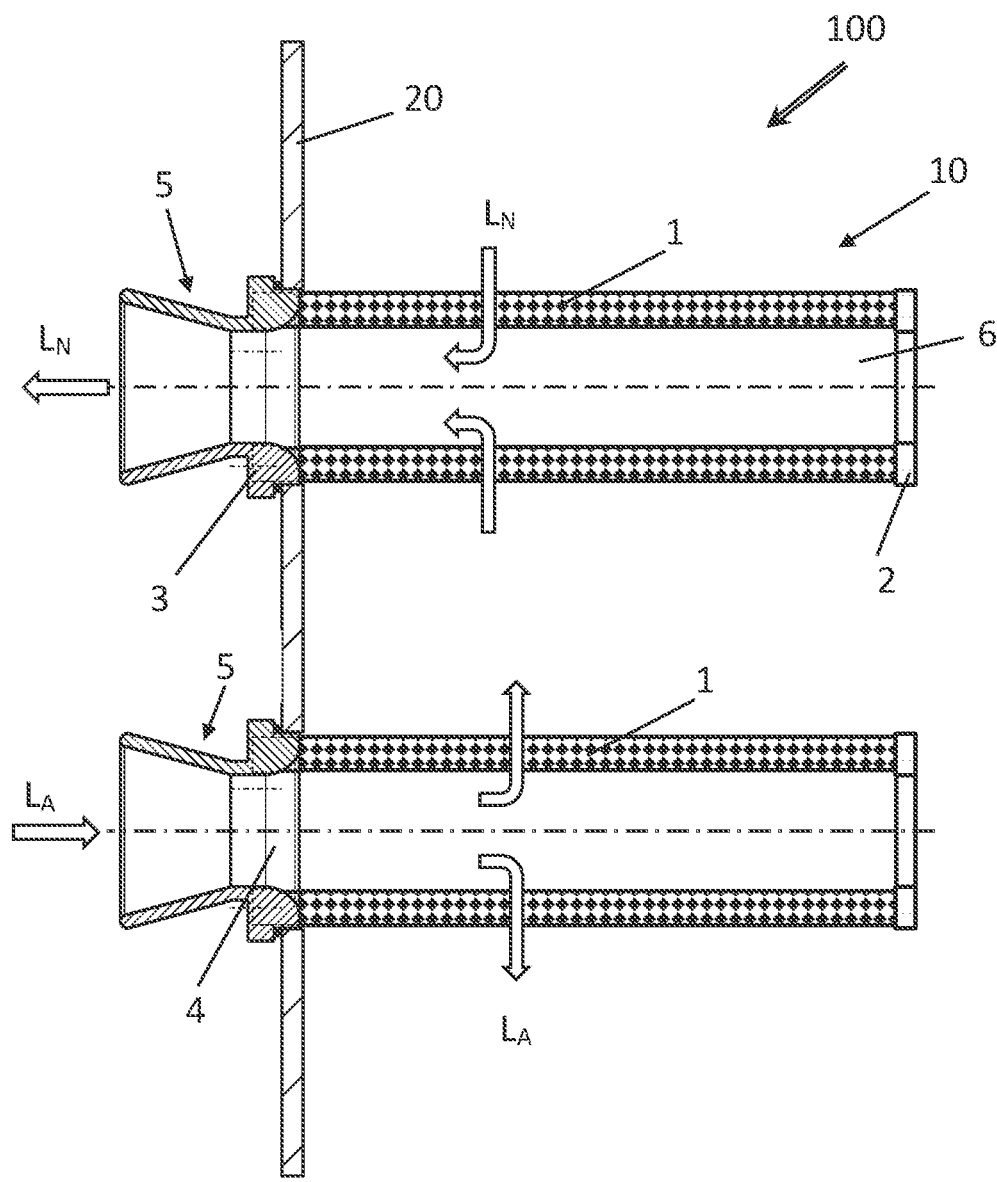
FIG. 1 schematically depicts a device for filtering with filter cartridges according to an embodiment of the invention.

An embodiment of the present invention provides a filter cartridge which combines a higher energy efficiency during normal operation with good cleanability, and at least partially eliminates the disadvantages of the prior art. According to an embodiment, the filter cartridge includes a base, a cover provided with a central recess, and at least one pleated filter element arranged between the cover and the base. The at least one filter element encloses an interior space. The cover has a venturi nozzle and the venturi nozzle engages in the pleated filter element.

A filter cartridge according to an embodiment of the invention serves to clean a flow of air and has a base, a cover provided with a central recess, and at least one pleated filter element arranged between the cover and the base. The filter element thereby encloses an interior space of the filter cartridge. According to an embodiment, the cover of the filter cartridge has a venturi nozzle, and the venturi nozzle engages in the pleated filter element. Engagement does not thereby mean that the venturi nozzle is inserted into the interior space of the filter element, but rather that the venturi nozzle and the filter element transition into one another. Via this advantageous embodiment it is achieved that the cover through which the air can flow in the region of its recess is designed to be as large as possible, specifically that the area through which it can flow is designed to be as large as possible. The pressure losses caused by the present constriction can be reduced by this advantageous guidance of the air flow. Lower pressure losses are accompanied by an increase in the energy efficiency of the filter cartridge. In other words: Energy can be saved due to the higher energy efficiency of the filter cartridge.

If the filter cartridge is operated in normal operation, the air flows through the peripheral surface of the filter element, is thereby cleaned, and flows out again through the recess in the cover. In this instance, the described geometry serves for targeted flow guidance. In addition to normal operation, a cleaning operation of the filter cartridge is also made possible. For this purpose, an air pulse counter to the air flow during normal operation is routed through the filter cartridge.

If reference in the specification is made below to the inflow-side or outflow-side region, or to the inflow-side or the outflow-side diameter, these specifications relate to the air flow during normal operation.

In an advantageous embodiment of the filter cartridge according to the invention, the venturi nozzle is spread out in comb-like fashion in the region of its end engaging in the filter element. The venturi nozzle can have a plurality of radial lamellae in the region of this end engaging in the filter element, wherein a respective radial lamella is arranged radially around the interior space. The radial lamellae are spread out in their inflow-side region and are connected to one another in their outflow-side region. A respective radial lamella thereby engages between two folds of the pleated filter element.

Via this embodiment, it is achieved in an advantageous manner that the filter element transitions directly into the venturi nozzle, and there is no further reduction in the flow-through area of the interior space in the region of the transition. In the event of a round embodiment of the filter cartridge, the diameter of the flow-through surface thus corresponds approximately to the inner diameter of the filter element.

The venturi nozzle can be designed as one piece. In an alternative variant that is advantageous to production, the region of the venturi nozzle which is spread out in comb-like fashion, is designed as at least one separate component which can be assembled with at least one second component to form the venturi nozzle.

In an alternative variant that is advantageous to installation, the region of the venturi nozzle which is spread out in comb-like fashion is constituted by at least two components, namely as an internal comb and as an external comb, wherein the filter element is clamped between the internal comb and the external comb.

In an advantageous embodiment, the venturi nozzle is shaped in such a way that it has a choke point, and the choke diameter in the region of the choke point is less than an inflow-side diameter and less than an outflow-side diameter of the venturi nozzle. In particular, inflow-side and outflow-side diameters of the venturi nozzle can be the same size.

It has been recognized to be advantageous if the choke diameter of the venturi nozzle corresponds approximately to the inner diameter of the internal space in the filter element. In this way, steps and shoulders at the transition from the filter element to the venturi nozzle can be avoided, pressure losses can be reduced, and thus the efficiency of the filter cartridge can be increased.

The venturi nozzle can advantageously have a narrowing inlet profile in the region of its end engaging in the filter element, and a widening outlet profile in the region outside of the filter element in the outflow-side region. The air conduction through the venturi nozzle can thereby be optimized. The narrowing inlet profile can, for example, be designed as a rounded profile. The outlet profile can be designed as a slowly expanding outlet profile with an oblique profile, for example as an outlet cone.

It has further been recognized as advantageous to design the venturi nozzle as a in accordance with DIN EN ISO 5167.

In an advantageous embodiment of the filter cartridge according to the invention, its at least one filter element is brought into a cylindrical or frustum shape and has an oval, a substantially round, or a circular footprint in a section perpendicular to the longitudinal axis of the filter cartridge. Such a shaping of the filter element is particularly simple to realize in terms of manufacturing technology.

In an embodiment of the filter cartridge described above, its at least one filter element can be sealed off from the cover by an encapsulation material, for example polyurethane PUR. Thus, a bypass at the transition from the filter element to the venturi nozzle is avoided and a high efficiency of the filter cartridge is ensured.

In an alternative embodiment, the venturi nozzle can be made of an elastic material or can be coated with an elastic material at least in the region of its comb-like widening, which elastic material effects a sealing of the filter element relative to the venturi nozzle without an additional sealing material needing to be introduced.

Figure 4:
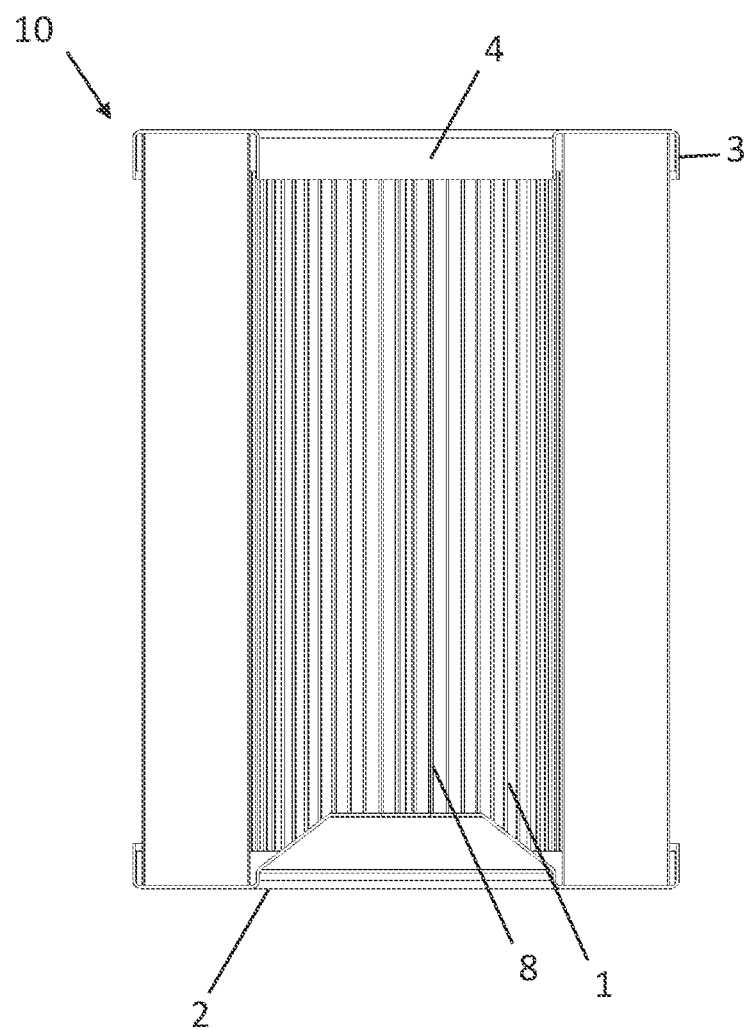
FIG. 4 schematically depicts a filter cartridge in accordance with the prior art

FIG. 4 shows a filter cartridge 10 in accordance with the prior art. Arranged between a base 2 and a cover 3 having a recess 4 is a pleated filter element 1 which encloses an interior space 6 (not shown) of the filter cartridge 10. In the illustrated example, the filter cartridge 10 has a cylindrical shape and the filter element 1 has likewise been brought into cylindrical form. The illustration of FIG. 4 shows a section through the filter cartridge 10 so that both the pleats 8 of the filter element 1 and the pleat segments, i.e. the surfaces which respectively lie between two pleat edges, can be recognized.

Should the air conduction in such a filter cartridge 10 be improved by use of a conventional venturi nozzle, the latter would be inserted into the recess 4. This results in a further reduction of the flow-through area in the region of the recess 4, and with it in normal operation an undesired pressure loss, which brings about a reduction in the filter efficiency of the filter cartridge 10.

FIG. 1 shows a device 100 for filtering air. Two filter cartridges 10 according to an embodiment of the invention are inserted into a perforated plate 20, i.e. a plate having holes. These have a base 2 and a cover 3 with a filter element 1 arranged between them that encloses an interior space 6 of the filter cartridge 10. In contrast to the filter cartridge 10 according to the prior art from FIG. 4, the filter cartridges 10 according to an embodiment of the invention each have a venturi nozzle 5 in the region of their cover 3. As can be seen in the section view, the venturi nozzle 5 engages in the filter element 1 so that the two transition into one another without the presence of steps or shoulders.

In the example of the upper filter cartridge 10, the air conduction $L_N$ was shown in normal operation. The air conduction $L_A$ when the filter cartridge is cleaned by an air pulse was depicted using the lower filter cartridge 10. Given air conduction $L_N$ in normal operation, air flows through the filter element 1 into the interior space 6 of the filter cartridge 10 and is thereby cleaned. The air leaves the filter cartridge 10 via the recess 4 in the venturi nozzle 5. The air conduction $L_N$ in normal operation can be optimized by a corresponding geometric embodiment of the venturi nozzle 5.

Given the cleaning of the filter cartridge 10 which is required at certain time intervals, the air conduction takes place in the opposite direction according to an embodiment: An air pulse $L_A$ enters into the interior space 6 of the filter cartridge 10 through the venturi nozzle 5, then flows through the filter element 1 and thereby causes the filter element 1 to be cleaned.

Figure 2:
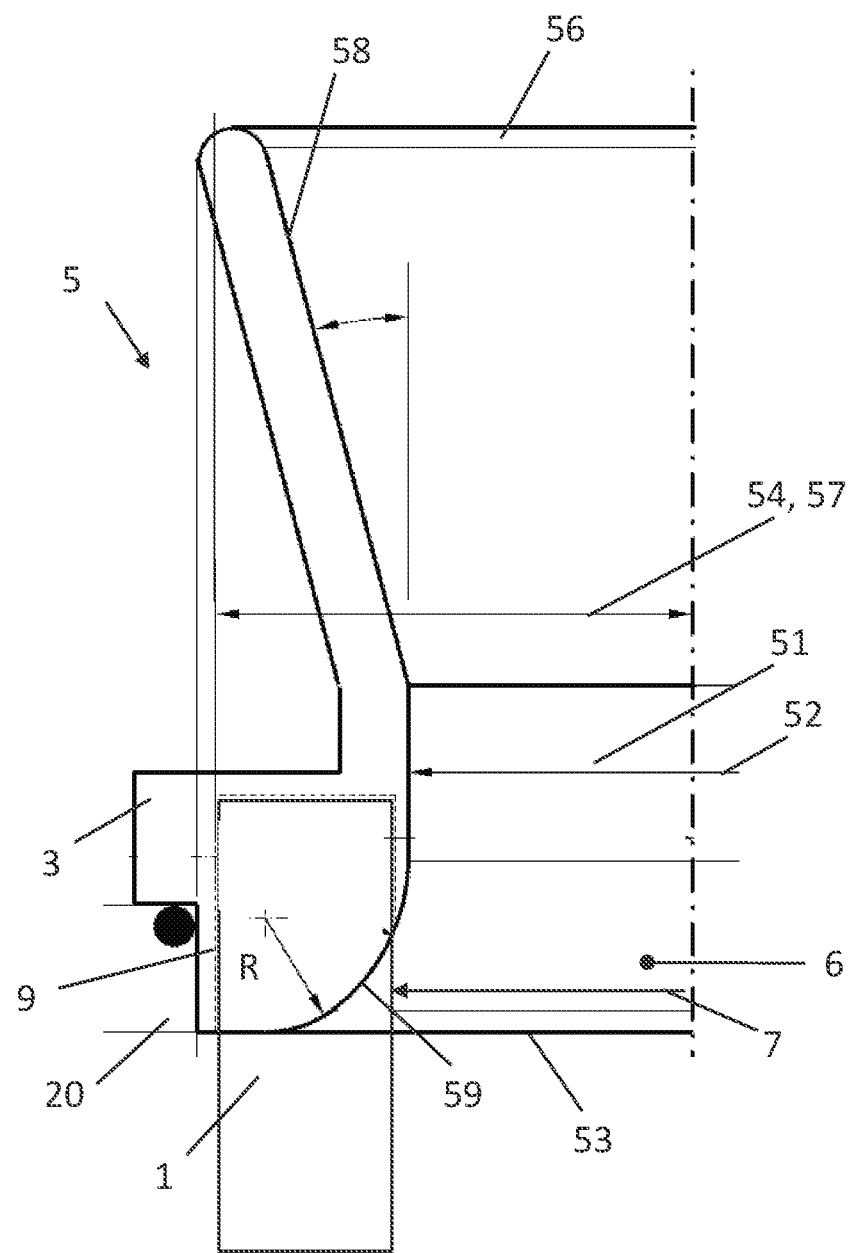
FIG. 2 schematically depicts the venturi nozzle of a filter cartridge in a section presentation, according to an embodiment of the invention.

The structure of the venturi nozzle 5 and the transition from the filter element 1 to the venturi nozzle 5, according to an embodiment, is shown in detail in the section view of FIG. 2. The venturi nozzle 5 has an inflow-side region 53 with an inflow-side diameter 54, and an outflow-side region 56 with an outflow-side diameter 57. A choke point 51 having a choke diameter 52 is arranged between the inflow-side region 53 and the outflow-side region 56. This forms the narrowest point of the venturi nozzle 5.

As can be seen in FIG. 2, the choke point 51 with the choke diameter 52 therefore represents the narrowest point of the cover 3. This location is thereby only insignificantly narrower than the inner diameter 7 of the filter element 1.

In the inflow-side region 53, the venturi nozzle 5, in an embodiment, has an inlet profile 55 with rounded profile having a radius r. In the outflow-side region 56, the venturi nozzle 5 has a slowly expanding, oblique outlet profile 58.

The venturi nozzle 5 engages in the pleated filter element 1 in the inflow-side region 53, according to an embodiment. For this purpose, the venturi nozzle 5 is spread out in comb-like fashion in this area and has a plurality of radial lamellae 59 which are arranged radially relative to the central axis of the venturi nozzle 5 in the region of the inflow-side diameter 54.

Figure 3A:
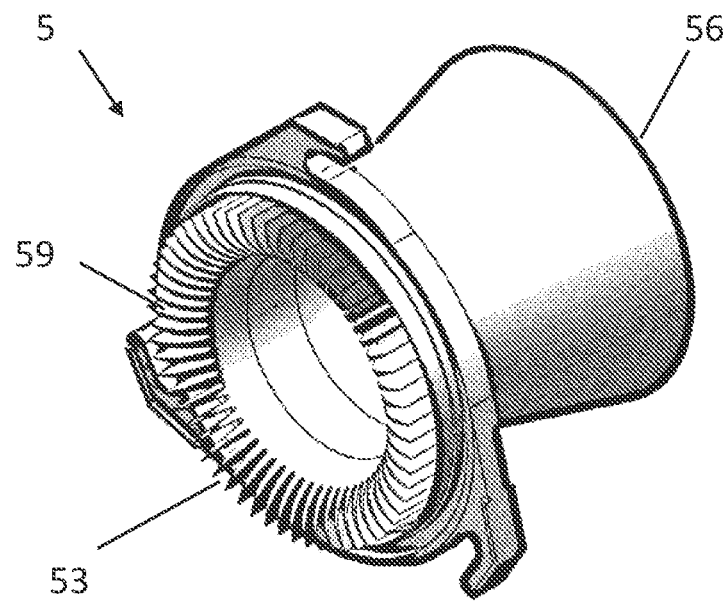
FIG. 3a schematically depicts the venturi nozzle from FIG. 2, in a spatial presentation, according to an embodiment of the invention.
Figure 3B:
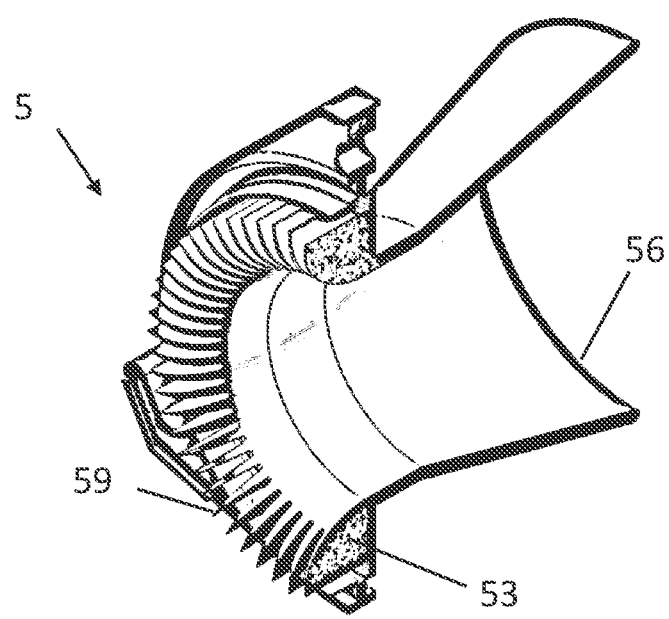
FIG. 3b schematically depicts the venturi nozzle from FIG. 3a, in a partial section, according to an embodiment of the invention.

The spreading of the venturi nozzle 5 by the radial lamellae 59, according to an embodiment is also shown in FIGS. 3a and 3b. As can be seen, the radial lamellae 59 are arranged at regular intervals from one another. This makes it possible that a respective radial lamella can engage between two pleats 8 of the pleated filter element 1. In other words, the ends of the pleat sections of the pleated filter element 1 that are associated with the venturi nozzle 5 can be inserted between the comb-like shape of the radial lamellae 59. In order to prevent bypasses between the filter element 1 and the venturi nozzle 5, the two can be encapsulated together with one another. In FIG. 2, the position 10 of an encapsulation material 9 used for this purpose is indicated by dashed lines.

Referring to the FIGS., an embodiment of the invention provides a filter cartridge 10 for cleaning an air flow $L_N$, comprising a base 2, a cover 3 provided with a central recess 4, and at least one pleated filter element 1 arranged between the cover 3 and the base 2. The embodiment achieves a filter cartridge which joins a higher energy efficiency during normal operation with good cleanability. In an embodiment, of the filter cartridge, the cover 3 has a venturi nozzle 5, and the venturi nozzle 5 engages in the pleated filter element 1 and, in particular, is spread out there in comb-like fashion. The advantageous flow conduction of the air flow thus results in an increase in the energy efficiency of the filter cartridge.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Filter element
2 Base
3 Cover
4 Recess
5 Venturi nozzle
6 Interior space
7 Inner diameter of filter element
8 Filter element pleats
9 Encapsulation material
10 Filter cartridge
20 Perforated plate
51 Choke point
52 Choke diameter
53 Inflow-side region
54 Inflow-side diameter
55 Inlet profile
56 Outflow-side region
57 Outflow-side diameter
58 Outlet profile
59 Radial lamella
100 Device for filtering air
$L_N$ Air conduction in normal operation
$L_A$ Air conduction during cleaning via air pulse
R Radius of the rounded inlet profile

What is claimed is:

1. A filter cartridge for cleaning an air flow, the filter cartridge comprising:
    a base,
    a cover provided with a central recess, and
    at least one pleated filter element arranged between the cover and the base, wherein the at least one filter element encloses an interior space,
    wherein the cover has a venturi nozzle, the venturi nozzle engages in the pleated filter element, and the venturi nozzle is spread out in comb-like fashion in the region of its end engaging in the filter element.

2. The filter cartridge according to claim 1, wherein the venturi nozzle has a plurality of radial lamellae in the region of its end engaging in the filter element, wherein a respective radial lamella engages between two pleats of the pleated filter element.

3. The filter cartridge according to claim 1, wherein the venturi nozzle has a choke point, such that the choke diameter is smaller than an inflow-side diameter and an outflow-side diameter of the venturi nozzle.

4. The filter cartridge according to claim 3, wherein the inflow-side and outflow-side diameters are the same size.

5. The filter cartridge according to claim 3, wherein the choke diameter corresponds approximately to the inner diameter of the internal space in the filter element.

6. The filter cartridge according to claim 1, wherein the venturi nozzle has a narrowing inlet profile in the region of its end engaging in the filter element, and a widening outlet profile in the region outside the filter element.

7. The filter cartridge according to claim 1, wherein the venturi nozzle is designed in accordance with DIN EN ISO 5167.

8. The filter cartridge according to claim 1, wherein the filter element is brought into a cylindrical or frustum shape and has an oval, substantially round, or circular footprint in section.

9. The filter cartridge claim 1, wherein the filter element is sealed off from the cover by an encapsulation material.

10. A filter cartridge for cleaning an air flow, the filter cartridge comprising:
    a base,
    a cover provided with a central recess, and at least one pleated filter element arranged between the cover and the base, wherein the at least one filter element encloses an interior space, wherein the cover has a venturi nozzle, the venturi nozzle engages in the pleated filter element, and the venturi nozzle has a choke point, such that the choke diameter is smaller than an inflow-side diameter and an outflow-side diameter of the venturi nozzle.

11. The filter cartridge according to claim 10, wherein the inflow-side and outflow-side diameters are the same size.

12. The filter cartridge according to claim 10, wherein the choke diameter corresponds approximately to the inner diameter of the internal space in the filter element.

13. The filter cartridge according to claim 10, wherein the venturi nozzle has a narrowing inlet profile in the region of its end engaging in the filter element, and a widening outlet profile in the region outside the filter element.

14. The filter cartridge according to claim 10, wherein the venturi nozzle is designed in accordance with DIN EN ISO 5167.

15. The filter cartridge according to claim 10, wherein the filter element is brought into a cylindrical or frustum shape and has an oval, substantially round, or circular footprint in section.

16. The filter cartridge claim 10, wherein the filter element is sealed off from the cover by an encapsulation material.

17. The filter cartridge according to claim 10, wherein the venturi nozzle has a plurality of radial lamellae in the region of its end engaging in the filter element, wherein a respective radial lamella engages between two pleats of the pleated filter element.

\* \* \* \* \*